United States Patent
Takahashi

(10) Patent No.: US 12,513,423 B2
(45) Date of Patent: Dec. 30, 2025

(54) IMAGE PROCESSING APPARATUS GENERATING A COMBINED IMAGE, IMAGE PICKUP APPARATUS, AND IMAGE PROCESSING METHOD

(71) Applicant: CANON KABUSHIKI KAISHA, Tokyo (JP)

(72) Inventor: Yoichi Takahashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 105 days.

(21) Appl. No.: 18/544,823

(22) Filed: Dec. 19, 2023

(65) Prior Publication Data
US 2024/0214678 A1  Jun. 27, 2024

(30) Foreign Application Priority Data

Dec. 23, 2022 (JP) ................. 2022-206727

(51) Int. Cl.
| | |
|---|---|
| H04N 25/61 | (2023.01) |
| G06T 5/50 | (2006.01) |
| G06T 5/80 | (2024.01) |
| G06T 7/33 | (2017.01) |
| H04N 23/68 | (2023.01) |
| H04N 23/741 | (2023.01) |
| H04N 23/743 | (2023.01) |
| H04N 25/611 | (2023.01) |

(52) U.S. Cl.
CPC ............ *H04N 25/61* (2023.01); *G06T 5/50* (2013.01); *G06T 5/80* (2024.01); *G06T 7/337* (2017.01); *H04N 23/741* (2023.01); *H04N 23/743* (2023.01); *H04N 25/611* (2023.01); *G06T 2207/20212* (2013.01); *H04N 23/687* (2023.01)

(58) Field of Classification Search
None
See application file for complete search history.

(56) References Cited

U.S. PATENT DOCUMENTS

| | | | |
|---|---|---|---|
| 2011/0043667 A1* | 2/2011 | Kotani | H04N 25/61 |
| | | | 348/241 |
| 2023/0316461 A1* | 10/2023 | Chen | G06T 5/50 |

FOREIGN PATENT DOCUMENTS

| | | | | |
|---|---|---|---|---|
| CN | 113905183 A | * | 1/2022 | ........... H04N 23/741 |
| JP | 2008-092548 A | | 4/2008 | |

* cited by examiner

*Primary Examiner* — Paul M Berardesca
(74) *Attorney, Agent, or Firm* — Cowan, Liebowitz & Latman, P.C.

(57) ABSTRACT

An image processing apparatus is configured to process a plurality of images acquired by sequentially capturing an object image. The image processing apparatus detects a positional shift amount between the plurality of images, generate a combined image by combining the plurality of images that have been aligned based on the positional shift amount, and acquire an optical center position of the combined image based on the positional shift amount. The optical center position is a reference position in performing optical correction processing for the combined image. A correcting amount in the optical correction processing changes according to a distance from the reference position.

33 Claims, 6 Drawing Sheets

IMAGE PROCESSING APPARATUS GENERATING A COMBINED IMAGE, IMAGE PICKUP APPARATUS, AND IMAGE PROCESSING METHOD

BACKGROUND

Technical Field

One of the aspects of the embodiments relates to an image processing apparatus, an image pickup apparatus, an image processing method, and a storage medium.

Description of Related Art

One conventional method performs optical correction processing and development processing for a digital signal (RAW data) output from an image sensor using divided exposure, then corrects positional shifts between a plurality of images, and combines the plurality of images. In a case where a plurality of images are combined after the optical correction processing and development processing, a combined image for which each of the above processing has been performed is recorded, so the parameters of the optical correction processing and development processing in the recorded combined image cannot be changed. On the other hand, correcting a positional shift amount using RAW data before the optical correction processing and development processing and recording the combined image can change the parameters of optical correction processing and development processing in the recorded combined image.

Japanese Patent Laid-Open No. 2008-92548 discloses an image pickup apparatus that generates a combined image after correcting positional shifts among a plurality of captured images, and performs peripheral light attenuating correction for the combined image in consideration of the peripheral light attenuating characteristic of the optical system.

In a case where a combined image is generated by correcting the position using RAW data, images are combined while they are shifted by the correcting amount of the optical center position of each captured image, so it is difficult to apply the desired optical correction processing to the combined image. The method disclosed in Japanese Patent Laid-Open No. 2008-92548 cannot be widely applied to various optical correction processing such as distortion and chromatic aberration.

SUMMARY

An image processing apparatus according to one aspect of the embodiment is configured to process a plurality of images acquired by sequentially capturing an object image. The image processing apparatus includes a memory storing instructions, and a processor configured to execute the instructions to detect a positional shift amount between the plurality of images, correct the positional shift amount, generate a combined image by combining the plurality of images in which the positional shift amount has been corrected, and acquire an optical center position of the combined image based on the positional shift amount. The optical center position is a reference position in performing optical correction processing for the combined image. A correcting amount in the optical correction processing changes according to a distance from the reference position. An image pickup apparatus having the above image processing apparatus also constitutes another aspect of the embodiment. An image processing method corresponding to the above image pickup apparatus also constitutes another aspect of the embodiment.

Further features of the disclosure will become apparent from the following description of embodiments with reference to the attached drawings.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

Figure 1:
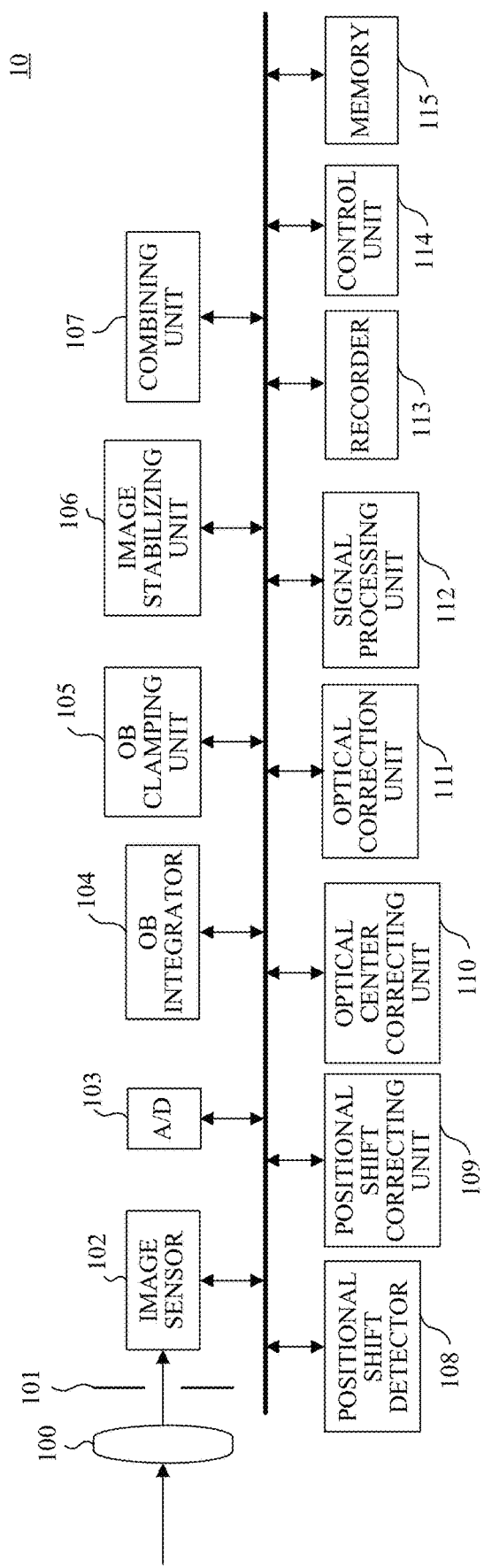
FIG. 1 is a block diagram of an image pickup apparatus according to this embodiment.

Referring now to FIG. 1, a description will be given of an image pickup apparatus (image processing apparatus) 10 according to this embodiment. FIG. 1 is a block diagram of an image pickup apparatus 10. The image pickup apparatus 10 can process a plurality of images acquired by continuously capturing an object image. In a case where an unillustrated shutter switch SW2 is pressed, the light beam incident on the lens (imaging optical system) 100 passes through an aperture stop 101 and forms an object image on the image sensor 102. In this embodiment, the image pickup apparatus 10 is configured such that the lens apparatus including the lens 100 and the camera body including the image sensor 102 are attachable and detachable, but they may be integrated.

The image sensor 102 converts an optical image of an object image into an electrical signal and outputs an image signal (analog signal). The image sensor 102 has a Bayer array configuration in which R (red), G1 (green), G2 (green), and B (blue) pixels are regularly arranged. The analog signal output from the image sensor 102 is converted into a digital signal (RAW data) by an A/D converter 103 and once stored in a memory 115. The RAW data is data that has not yet received predetermined development processing.

Figure 2:
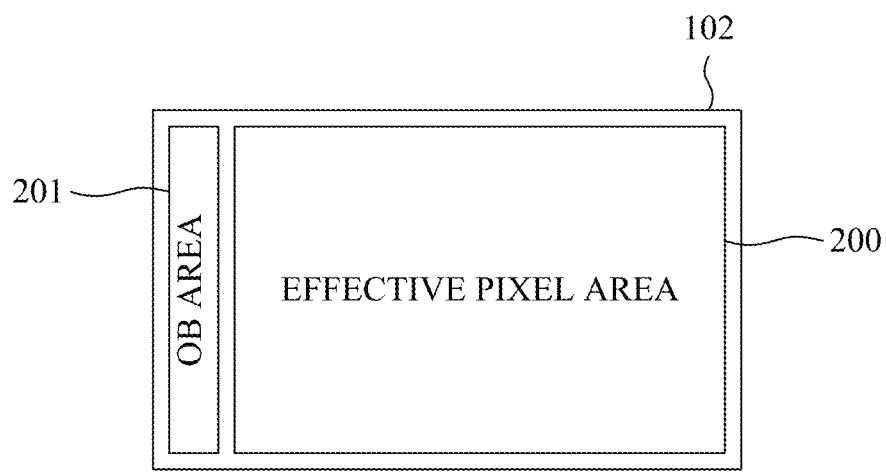
FIG. 2 is a pixel array diagram of an image sensor according to this embodiment.

Referring now to FIG. 2, a description will be given of the pixel array on the image sensor 102. FIG. 2 is a pixel array diagram of the image sensor 102. As illustrated in FIG. 2, the image sensor 102 is a photodiode (photoelectric conversion element) including an effective pixel area 200 that is irradiated with light, and an optical black area (OB area) 201 where a predetermined area of the photodiode is shielded from light by an aluminum thin film or the like. That is, the effective pixel area 200 is a non-shielded area, and the OB area 201 is a shielded area. The OB integrator 104 integrates the pixel values of the OB area 201 for each of R, G1, G2, and B of the Bayer array, and outputs the average value of the OB. The output value of the OB integrator 104 is set as a dark level, and an OB clamp unit 105 performs OB clamping processing. The OB clamping processing can prevent problems such as black floating and color shift.

An image stabilizing unit (image stabilizing mechanism) 106 has a gyro sensor, calculates an image stabilizing amount from information about a rotation angle (pitch direction, yaw direction, roll direction) of the camera acquired during exposure, and communicates the image stabilizing amount (camera shake correcting amount) to a control unit 114. The control unit 114 optically suppresses camera shake during exposure by driving the physical position of the image sensor 102 in a direction orthogonal to the optical axis by the image stabilizing amount. The lens 100 as an imaging optical system has an image stabilizing lens that provides image stabilization, acquires the image stabilizing amount acquired by the image stabilizing unit 106, and drives the image stabilizing lens to optically suppress camera shake during exposure. A memory 115 stores RAW data, image data processed by the signal processing unit 112, and the like.

A combining unit 107 generates a combined image by combining a plurality of images in which a positional shift amount has been corrected, that is, which have been aligned based on the positional shift amount. The combining unit 107 performs various calculations depending on the combining method of the divided exposure imaging mode. In this embodiment, the combining unit 107 performs various calculations according to three combining methods: an addition mode, an average addition mode, and a comparative bright mode. Now assume I_i (x, y) (where i=1 to N, x and y represent the coordinates in the image (screen)) is a luminance value of each image before the combination (pre-combination image), and I(x, y) is a luminance value of an image after the combination (post-combination image) of the N images. At this time, the addition mode is expressed by the following equation (1), and combined image data is acquired by adding the luminance values of N images for each pixel:

$$I(x, y) = I\_1(x, y) + I\_2(x, y) + \ldots + I\_N(x, y) \quad (1)$$

The average addition mode is expressed by the following equation (2), and combined image data is acquired by averaging the luminance values of N images for each pixel:

$$I(x, y) = (I\_1(x, y) + I\_2(x, y) + \ldots + I\_N(x, y))/N \quad (2)$$

The comparative bright mode is expressed by the following equation (3), and the combined image data is the maximum value of the luminance values of N images selected for each pixel.

$$I(x, y) = \max(I\_1(x, y), I\_2(x, y), \ldots, I\_N(x, y)) \quad (3)$$

The signal processing unit 112 performs development processing such as white balance processing, color matrix processing, or gamma processing for the RAW data or the RAW data combined by the combining unit 107. A recorder 113 records RAW data, RAW data combined by the combining unit 107, image data developed by the signal processing unit 112, and the like. The control unit 114 performs overall control of the image pickup apparatus 10.

A positional shift detector 108 detects a positional shift amount in pixel units between a plurality of continuously captured images. This embodiment performs template matching for a reference image (first image, first image) and an alignment image, and detects a shift amount (positional shift amount) in units of pixels. Template matching is a method of cutting out a specific area of an image, measuring an absolute value of a difference between the specific areas by shifting the template position, and setting a shift amount with the smallest difference as the positional shift amount. This embodiment detects the positional shift amount using template matching of images, but is not limited to this example. For example, a rotation angle of the image pickup apparatus during continuous imaging may be acquired using a gyro sensor, and a positional shift amount between images may be calculated from a focal length and the rotation angle.

A positional shift correction unit 109 corrects the positional shift amount detected by the positional shift detector 108. More specifically, the positional shift correction unit 109 corrects the position of the RAW data based on the positional shift amount for each pixel detected by the positional shift detector 108, and outputs the corrected position to the memory 115. In addition, the positional shift correction unit 109 reads a part of the RAW data and changes the positional shift correcting amount for each area.

The optical center correction unit 110 acquires (calculates) an optical center position (optical center coordinates) of the combined image based on the positional shift amount detected by the positional shift detector 108, and outputs information on the optical center position of the combined image to the memory 115. Here, the optical center position is a reference position in performing the optical correction processing for the combined image, and a correcting amount in the optical correction processing changes depending on a distance from the reference position. The method for calculating the optical center coordinates will be described below.

The lens 100 is attachable to and detachable from the camera body, and when the lens 100 is attached to the camera body, the control unit 114 acquires optical correction data from the lens 100 and outputs it to the memory 115. The optical correction unit 111 calculates an optical correction value based on the optical correction data acquired from the lens 100. The control unit 114 performs control (optical correction processing) regarding optical correction such as peripheral light amount correction, distortion correction, lateral chromatic aberration correction, and image restoration (image recovery) based on the optical correction value calculated by the optical correction unit 111.

The optical correction unit 111 calculates a distortion correction value from the distortion correction information. The control unit 114 then sets the calculated distortion correction value and corrects distortion. The optical correction unit 111 also calculates a lateral chromatic aberration correction value from the lateral chromatic aberration correction information. The control unit 114 then sets the calculated correction value and performs lateral chromatic aberration correction processing. The optical correction unit 111 also calculates a peripheral light amount correction value from the peripheral light amount correction information. The control unit 114 then sets the calculated peripheral light amount correction value and performs peripheral light amount correction processing for the image data. The optical correction unit 111 also calculates a restoration coefficient for image restoration from the image restoration processing information. The control unit 114 then sets the calculated image restoration coefficient and performs image restoration processing. The optical correction processing described above is merely illustrative, and a configuration for performing other optical correction processing may be adopted, or a configuration for not performing one or more of the above optical correction processing.

Figure 6A:
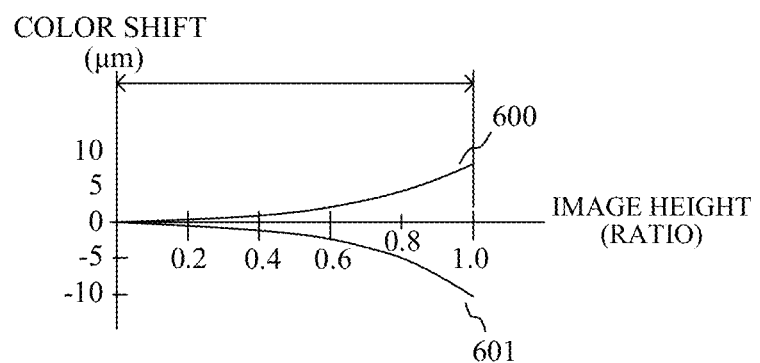
FIGS. 6A to 6D illustrate a relationship between an image height and an optical correction value in this embodiment.

Referring now to FIGS. 6A to 6D, a detailed description will be given of the optical correction unit 111. FIGS. 6A to 6D illustrate a relationship between image height and each correction value (optical correction value). FIG. 6A illustrates a correction value for correcting lateral chromatic aberration. The correction value is calculated by storing discrete data acquired by dividing the image height into a plurality of parts, and by performing interpolation calculation. In FIG. 6A, the horizontal axis represents an image height to be corrected, and the vertical axis represents a correcting amount. The lateral chromatic aberration is corrected using a correction value according to the image height.

In FIG. 6A, reference numeral 600 denotes a red lateral chromatic aberration correction value, and reference numeral 601 denotes a blue lateral chromatic aberration correction value. Lateral chromatic aberration is a phenomenon in which an image is distorted for each of the red and blue components. The lateral chromatic aberration is corrected by shifting the inner or outer pixels by the correction value to match the green component. The lateral chromatic aberration is corrected using the correction value that corresponds to an imaging distance, aperture value (F-number), and focal length, and an imaging condition. This embodiment will discuss an operation of performing the correction using a correction value that corresponds to an imaging distance, an aperture value (fully open F-number), and focal length (maximum focal length). The details regarding the optical aberration correcting method, which is performed using a correction value according to the imaging distance, F-number, and focal length are well known and a description thereof will be omitted. The correction value according to this embodiment is set such that correction is performed using correction data that is point symmetrical with respect to the optical axis. Correction values according to the imaging distance, F-number, and focal length can be stored in a small storage area. Thus, the correcting amount changes depending on the distance (image height) from the reference position. That is, as a position becomes closer to the optical center position, the correcting amount becomes smaller, and as the position becomes farther from the optical center position, the correcting amount becomes larger.

Figure 6B:
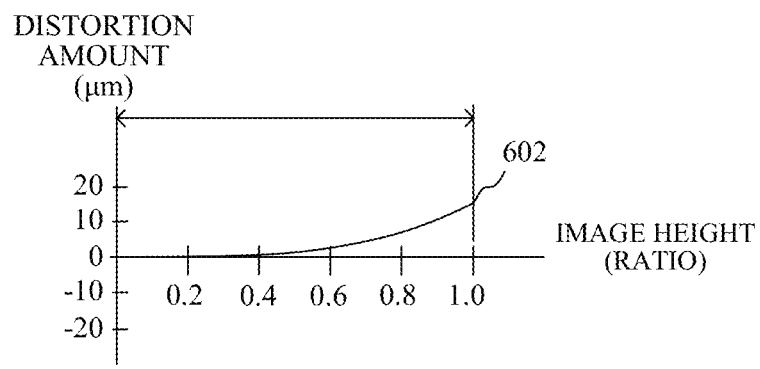
Figure 6C:
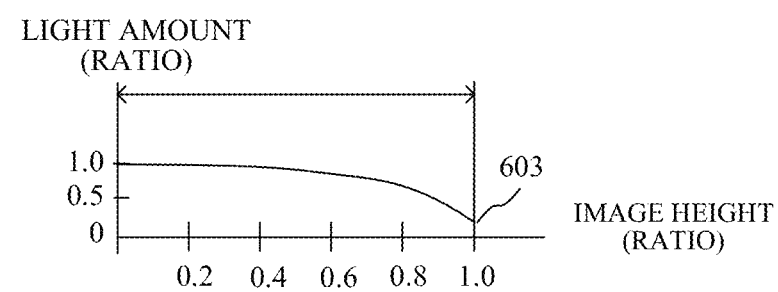
Figure 6D:
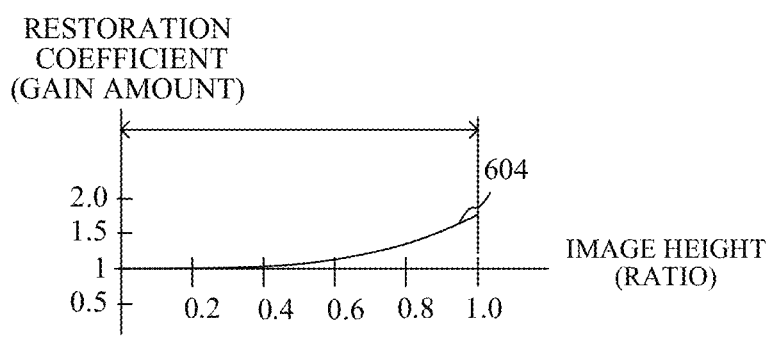

Each of the peripheral light amount correction, distortion correction, and image restoration processing is also corrected by storing two-dimensional correction data that illustrates an image height to be corrected on the horizontal axis and a correcting amount on the vertical axis, and by using the correction value according to the image height, similarly to the chromatic aberration correction. FIG. 6B illustrates a distortion correction value for the distortion correction processing. The distortion correction processing corrects distortion by moving pixels inward or outward by the distortion correction value. Reference numeral 602 denotes a distortion correction value according to the image height. FIG. 6C illustrates a peripheral light amount correction value of peripheral light amount correction processing. The peripheral light amount is corrected by multiplying a pixel value of pixels at the same image height according to the peripheral light amount correction value. Reference numeral 603 denotes a peripheral light amount correction value according to the image height. FIG. 6D illustrates a gain amount of a correction coefficient for the image restoration. The image restoration processing performs image restoration according to the image height by performing a plurality of multi-tap filter processing for pixels at the same image height according to image restoration correction coefficients, and by applying a gain amount according to the imaging condition to each filter. Reference numeral 604 denotes a gain amount of the image restoration coefficient according to the image height.

Figure 4:
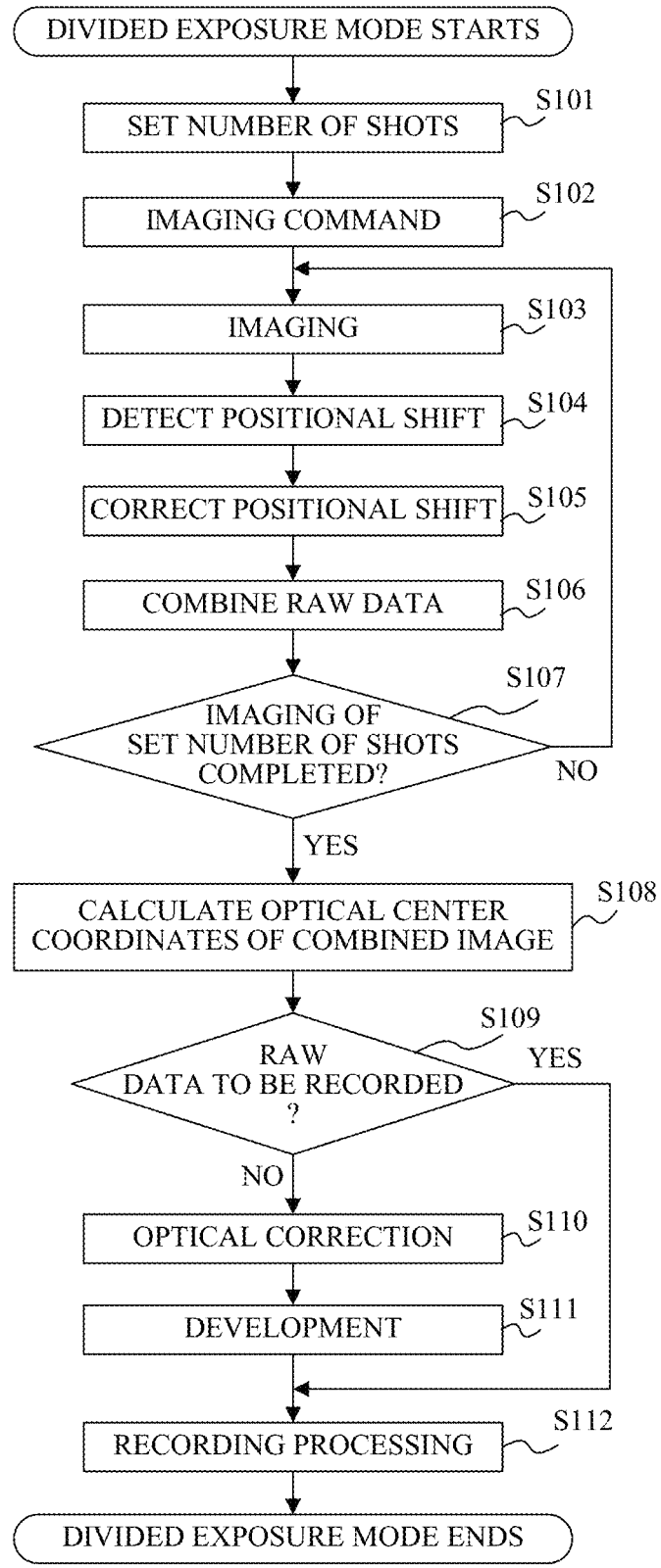
FIG. 4 is a flowchart of divided exposure imaging according to this embodiment.

Referring now to FIG. 4, a description will be given of divided exposure imaging according to this embodiment. FIG. 4 is a flowchart of divided exposure imaging. Each step in FIG. 4 is mainly executed by the control unit 114 or by each unit based on an instruction from the control unit 114.

First, in step S101, when the divided exposure imaging mode is started by a user operation, the control unit 114 sets the number of images to be imaged. Next, in step S102, the user issues an imaging instruction by pressing the shutter switch SW2. Next, in step S103, the control unit 114 performs continuous imaging until the number of images set in step S101 is completed, and repeats the combination while correcting the positional shift (steps S103 to S106). Steps S103 to S106 will be described in detail below.

In step S103, upon receiving the imaging instruction in step S102, the control unit 114 controls the image sensor 102 to image RAW data. Next, in step S104, the positional shift detector 108 sets the first image as a reference image and detects a shift amount from the currently captured image by template matching. At this time, the positional shift detector 108 arranges templates for a plurality of areas of the image and calculates positional shift amounts for the plurality of areas. Then, the positional shift detector 108 calculates a histogram for the calculated positional shift amount, and adopts the positional shift amount with the highest frequency as the final positional shift amount. Next, in step S105, the positional shift correction unit 109 aligns the image (RAW data) acquired in the most recent imaging with the reference image (alignment processing) using the positional shift amount detected in step S104.

Figure 3:
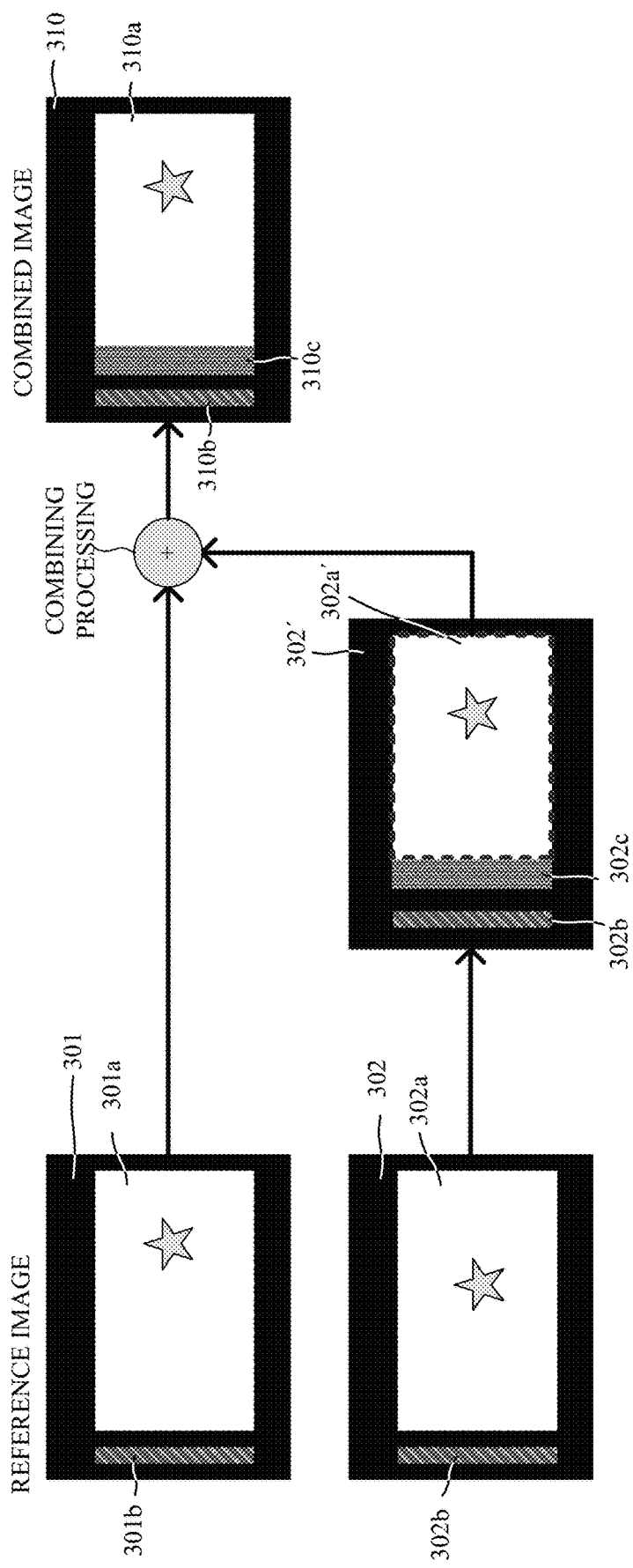
FIG. 3 explains alignment processing according to this embodiment.

Referring now to FIG. 3, a description will be given of the alignment processing. FIG. 3 explains the alignment processing, and schematically illustrates a method for aligning a second frame image (RAW data) 302 with a first frame image (RAW data) 301 as a reference image, and for performing the combining processing.

The image 301 has an effective pixel area 301a and an OB area 301b. Similarly, the image 302 has an effective pixel area 302a and an OB area 302b. Now assume that the mode of the positional shift correction unit 109 is set to a mode for aligning only images in the effective pixel areas. Therefore, in a post-alignment image 302', only an effective pixel area 302a' has moved, and the OB area 302b has not moved. As a result, the post-alignment image 302' has an area 302c having no pixels. If the mode of the positional shift correction unit 109 is set to a mode for aligning the entire frame, the appearance of the image 302 does not change before and after the alignment, although the coordinates information has been internally changed.

Next, in step S106 in FIG. 4, the combining unit 107 converts the image (image 302' in FIG. 3) whose positional shift has been corrected (aligned) in step S105 into the reference image or the combined image up to the previous frame. (combined RAW data). The combining unit 107 executes the above combining processing according to the set mode. FIG. 3 illustrates an example of combining processing in the average addition mode or the comparative bright mode for excluding the 302c having no pixels due to alignment from the combination target. As a result, the effective pixel area 310a of the combined image 310 includes an area 310c in which the second frame image is not combined. Regarding the OB area 310b of the combined image 310, the OB area 301b of the first frame and the OB area 302b of the second frame are combined using a method according to the mode.

Next, in step S107 of FIG. 4, the control unit 114 determines whether or not imaging for the number of shots (imaging number) set in step S101 has been completed. In a case where it is determined that imaging for the number of shots has not been completed, the flow returns to step S103. On the other hand, in a case where it is determined that imaging for the number of shots has been completed, the flow proceeds to step S108.

Figure 5:
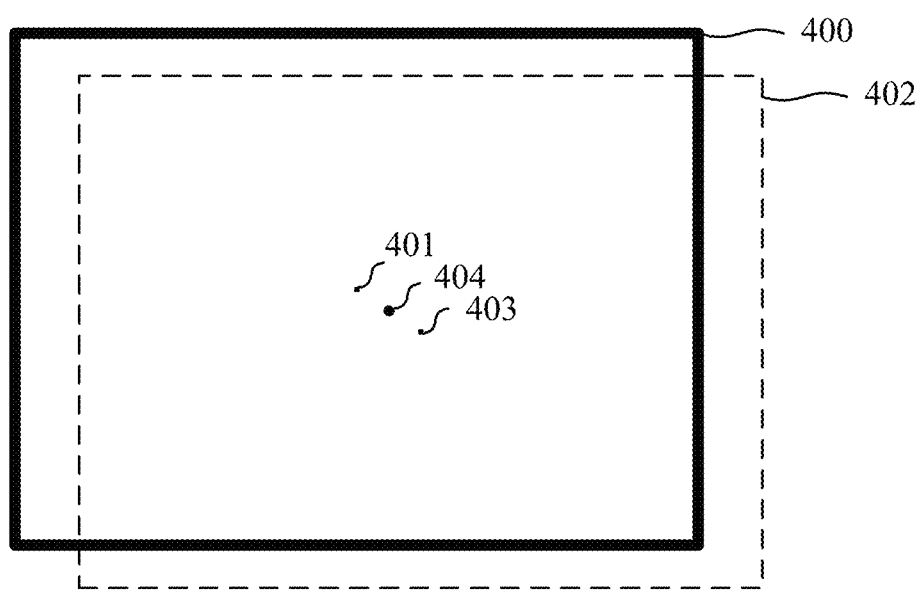
FIG. 5 explains a method for calculating optical center coordinates according to this embodiment.

Next, in step S108, the optical center correction unit 110 calculates (acquires) optical center coordinates (optical center position) for the combined RAW image (combined image). Referring now to FIG. 5, a description will be given of a method for calculating the optical center coordinates. FIG. 5 explains a method for calculating the optical center coordinates.

In combining two images, reference numeral 400 denotes a first image (development area) which becomes a reference image for positional shift correction, reference numeral 401 denotes optical center coordinates of the first image, and reference numeral 402 denotes a second image as a target of the positional shift correction. Reference numeral 403 denotes optical center coordinates of the second image. The optical center coordinates for the first image are center coordinates of the development area, and the optical center coordinates of each of the second and subsequent images are center coordinates of the development area, to which positional shift correction amounts are added in the horizontal direction and the vertical direction.

Average values of the optical center coordinates 401 of the first image and the optical center coordinates 403 of the second image are calculated in the horizontal and vertical directions and are set to optical center coordinates 404 of the combined image. Thus, in this embodiment, the optical center position of the combined image is the average value of the optical center positions of a plurality of images that are combined based on the positional shift amount. This example illustrates the combination of two images, but even if the number of images increases, the optical center coordinates of the image to be aligned can be similarly calculated, and the optical center coordinates of the images to be combined can be used to calculate an average value in each of the horizontal and vertical directions.

In optical image stabilization using the image stabilizing unit 106 during exposure, the optical center coordinates of each image (each captured image) may not be at the center of the developed area. In this case, the average value of the optical center coordinates during exposure may be calculated for each image, and the shift correcting amount due to alignment may be added to the calculated optical center coordinates to acquire the optical center coordinates of each image. That is, the optical center correction unit 110 may acquire the optical center coordinates of the combined image using the average value of the optical center coordinates of a plurality of images in a case where the optical image stabilization mechanism operates during exposure.

Next, in step S109 of FIG. 4, the control unit 114 determines whether or not RAW data is to be recorded (whether or not the user has enabled recording of RAW data). In a case where it is determined that RAW data is to be recorded, the flow proceeds to step S112. On the other hand, in a case where it is determined that RAW data is not to be recorded, the flow proceeds to step S110.

In step S110, the optical correction unit 111 and the control unit 114 perform optical correction processing for the combined RAW data (combined image) on the basis of the optical center coordinates. The optical correction processing is processing for changing the correcting amount according to the image height. Thus, the optical correction unit 111 sets the optical center coordinates of the combined image calculated in step S108 to image height 0 (reference position for the optical correction processing), and calculates the optical correction value of each of the lateral chromatic aberration correction, distortion correction, peripheral light amount correction, and image restoration. The control unit 114 then performs the optical correction processing for the combined image based on each calculated optical correction value. Next, in step S111, the signal processing unit 112 performs development processing for the combined RAW data that has been optically processed in step S110.

In step S112, the control unit 114 records the combined image in an external file such as an SD card. In a case where it is determined in step S109 that RAW data is to be recorded, the combined RAW data generated in step S106 is recorded. On the other hand, in a case where it is determined in step S109 that RAW data is not to be recorded, a developed image (developed image) in step S111 is recorded. The control unit 114 also records the optical center coordinates calculated in step S108 as meta information in a file. As information recorded at this time, a shift amount from the center coordinates of the development area can be recorded. The shift amount from the center coordinates can be determined from a difference between the center coordinates of the development area and the optically corrected center coordinates of the combined image. An image processing apparatus other than the image pickup apparatus 10 may perform at least part of the processing in steps S110 to S111 for the recorded composite RAW data.

As described above, in this embodiment, the control unit 114 determines whether or not to record RAW data based on the user setting. In a case where the control unit 114 determines that RAW data is not to be recorded, it performs optical correction processing for the combined image, and records a developed image of the combined image after the optical correction processing in the recorder 113. On the other hand, in a case where the control unit 114 determines that RAW data is to be recorded, it records the combined image and the optical center position of the combined image in the recorder 113.

For the peripheral light amount correction performed in the optical correction in step S110, as disclosed in Japanese Patent Laid-Open No. 2008-92548, peripheral light amount correction data itself may be stored as image map information that indicates a relationship among a horizontal image height, a vertical increase, and a correction value. In this case, the positions can be corrected and combined based on the correcting positional shift amount, and peripheral light amount correction can be performed for the combined RAW data.

In this embodiment, the image pickup apparatus performs the processing of steps S101 to S112, but separate apparatuses may perform the step of acquiring a plurality of images and the step of correcting a positional shift and combining the plurality of images. For example, an image pickup apparatus may capture an image a plurality of times to obtain images for image combination, and an image processing apparatus that acquires a plurality of images may detect and correct positional shifts of these images, and perform the image combination. In such a configuration, the image processing apparatus configured to detect and correct positional shifts of the plurality of images and to perform image combination may have no imaging function. Alternatively, the processing of steps S108 to S112 may be performed in the image processing apparatus that has performed the image combination. The image processing apparatus that has performed image combination may not have a function of performing optical correction processing or development processing, and step S109 may be omitted and step S112 may be performed after step S108.

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This embodiment can provide an image processing apparatus that can perform proper optical correction processing for a combined image acquired by combining a plurality of images after their positional shifts are corrected.

This application claims the benefit of Japanese Patent Application No. 2022-206727, filed on Dec. 23, 2022, which is hereby incorporated by reference herein in its entirety.

What is claimed is:

1. An image processing apparatus configured to process a plurality of images acquired by sequentially capturing an object image, the image processing apparatus comprising:
   a memory storing instructions; and
   a processor configured to execute the instructions to:
   detect a positional shift amount between the plurality of images,
   generate a combined image by combining the plurality of images that have been aligned based on the positional shift amount, and
   acquire an optical center position of the combined image based on the positional shift amount,
   wherein the plurality of images are RAW data,
   wherein the optical center position is a reference position in performing optical correction processing for the combined image,
   wherein a correcting amount in the optical correction processing changes according to a distance from the reference position, and
   wherein the processor is configured to:
   determine whether or not to record the RAW data based on a setting by a user,
   perform the optical correction processing for the combined image, record a developed image of the combined image that has received the optical correction processing in a recorder, in a case where it is determined that the RAW data is not to be recorded, and
   record the combined image and the optical center position of the combined image in the recorder in a case where it is determined that the RAW data is to be recorded.

2. The image processing apparatus according to claim 1, wherein the processor is configured to perform the optical correction processing for the combined image.

3. The image processing apparatus according to claim 1, wherein the optical correction processing includes peripheral light amount correction.

4. The image processing apparatus according to claim 1, wherein the optical correction processing includes lateral chromatic aberration correction.

5. The image processing apparatus according to claim 1, wherein the optical correction processing includes distortion correction.

6. The image processing apparatus according to claim 1, wherein the optical correction processing includes image restoration processing.

7. The image processing apparatus according to claim 1, wherein the optical center position of the combined image is an average value of optical center positions of the plurality of images combined based on the positional shift amount.

8. The image processing apparatus according to claim 1, wherein the processor is configured to acquire the optical center position of the combined image using an average value of optical center positions of the plurality of images in a case where an optical image stabilization mechanism operates during exposure.

9. The image processing apparatus according to claim 1, wherein the processor is configured to correct the positional shift amount using a first image among the plurality of images as a reference image.

10. An image pickup apparatus comprising:
an image sensor;
a memory storing instructions; and
a processor configured to execute the instructions to:
detect a positional shift amount between a plurality of images acquired by sequentially capturing an object image with the image sensor,
generate a combined image by combining the plurality of images that have been aligned based on the positional shift amount, and
acquire an optical center position of the combined image based on the positional shift amount,
wherein the plurality of images are RAW data,
wherein the optical center position is a reference position in performing optical correction processing for the combined image,
wherein a correcting amount in the optical correction processing changes according to a distance from the reference position, and
wherein the processor is configured to:
determine whether or not to record the RAW data based on a setting by a user,
perform the optical correction processing for the combined image, record a developed image of the combined image that has received the optical correction processing in a recorder, in a case where it is determined that the RAW data is not to be recorded, and
record the combined image and the optical center position of the combined image in the recorder in a case where it is determined that the RAW data is to be recorded.

11. An image processing method for processing a plurality of images acquired by sequentially capturing an object image, the image processing method comprising the steps of:
detecting a positional shift amount between the plurality of images;
generating a combined image by combining the plurality of images that have been aligned based on the positional shift amount; and
acquiring an optical center position of the combined image based on the positional shift amount,
wherein the plurality of images are RAW data,
wherein the optical center position is a reference position in performing optical correction processing for the combined image,
wherein a correcting amount in the optical correction processing changes according to a distance from the reference position, and
wherein determining whether or not to record the RAW data based on a setting by a user,
wherein performing the optical correction processing for the combined image, recording a developed image of the combined image that has received the optical correction processing in a recorder, in a case where it is determined that the RAW data is not to be recorded, and
wherein recording the combined image and the optical center position of the combined image in the recorder in a case where it is determined that the RAW data is to be recorded.

12. An image processing apparatus configured to process a plurality of images acquired by sequentially capturing an object image, the image processing apparatus comprising:
a memory storing instructions; and
a processor configured to execute the instructions to:
detect a positional shift amount between the plurality of images,
generate a combined image by combining the plurality of images that have been aligned based on the positional shift amount, and
acquire an optical center position of the combined image based on the positional shift amount,
wherein the optical center position is a reference position in performing optical correction processing for the combined image,
wherein a correcting amount in the optical correction processing changes according to a distance from the reference position, and
wherein the optical center position of the combined image is an average value of optical center positions of the plurality of images combined based on the positional shift amount.

13. The image processing apparatus according to claim 12, wherein the processor is configured to perform the optical correction processing for the combined image.

14. The image processing apparatus according to claim 12, wherein the processor is configured to record the combined image and the optical center position of the combined image in a recorder.

15. The image processing apparatus according to claim 12, wherein the plurality of images are RAW data.

16. The image processing apparatus according to claim 12, wherein the optical correction processing includes peripheral light amount correction.

17. The image processing apparatus according to claim 12, wherein the optical correction processing includes lateral chromatic aberration correction.

18. The image processing apparatus according to claim 12, wherein the optical correction processing includes distortion correction.

19. The image processing apparatus according to claim 12, wherein the optical correction processing includes image restoration processing.

20. The image processing apparatus according to claim 12, wherein the processor is configured to correct the positional shift amount using a first image among the plurality of images as a reference image.

21. An image processing apparatus configured to process a plurality of images acquired by sequentially capturing an object image, the image processing apparatus comprising:
a memory storing instructions; and
a processor configured to execute the instructions to:
detect a positional shift amount between the plurality of images,
generate a combined image by combining the plurality of images that have been aligned based on the positional shift amount, and
acquire an optical center position of the combined image based on the positional shift amount,
wherein the optical center position is a reference position in performing optical correction processing for the combined image, wherein a correcting amount in the optical correction processing changes according to a distance from the reference position, and wherein the processor is configured to acquire the optical center position of the combined image using an average value of optical center positions of the plurality of images in a case where an optical image stabilization mechanism operates during exposure.

22. The image processing apparatus according to claim 21, wherein the processor is configured to perform the optical correction processing for the combined image.

23. The image processing apparatus according to claim 21, wherein the processor is configured to record the combined image and the optical center position of the combined image in a recorder.

24. The image processing apparatus according to claim 21, wherein the plurality of images are RAW data.

25. The image processing apparatus according to claim 21, wherein the optical correction processing includes peripheral light amount correction.

26. The image processing apparatus according to claim 21, wherein the optical correction processing includes lateral chromatic aberration correction.

27. The image processing apparatus according to claim 21, wherein the optical correction processing includes distortion correction.

28. The image processing apparatus according to claim 21, wherein the optical correction processing includes image restoration processing.

29. The image processing apparatus according to claim 21, wherein the processor is configured to correct the positional shift amount using a first image among the plurality of images as a reference image.

30. An image pickup apparatus comprising:
an image sensor;
a memory storing instructions; and
a processor configured to execute the instructions to:
detect a positional shift amount between a plurality of images acquired by sequentially capturing an object image with the image sensor,
generate a combined image by combining the plurality of images that have been aligned based on the positional shift amount, and
acquire an optical center position of the combined image based on the positional shift amount,
wherein the optical center position is a reference position in performing optical correction processing for the combined image,
wherein a correcting amount in the optical correction processing changes according to a distance from the reference position, and
wherein the optical center position of the combined image is an average value of optical center positions of the plurality of images combined based on the positional shift amount.

31. An image pickup apparatus comprising:
an image sensor;
a memory storing instructions; and
a processor configured to execute the instructions to:
detect a positional shift amount between a plurality of images acquired by sequentially capturing an object image with the image sensor,
generate a combined image by combining the plurality of images that have been aligned based on the positional shift amount, and
acquire an optical center position of the combined image based on the positional shift amount,
wherein the optical center position is a reference position in performing optical correction processing for the combined image, and
wherein a correcting amount in the optical correction processing changes according to a distance from the reference position, and
wherein the processor is configured to acquire the optical center position of the combined image using an average value of optical center positions of the plurality of images in a case where an optical image stabilization mechanism operates during exposure.

32. An image processing method for processing a plurality of images acquired by sequentially capturing an object image, the image processing method comprising the steps of:
detecting a positional shift amount between the plurality of images;
generating a combined image by combining the plurality of images that have been aligned based on the positional shift amount; and
acquiring an optical center position of the combined image based on the positional shift amount,
wherein the optical center position is a reference position in performing optical correction processing for the combined image,
wherein a correcting amount in the optical correction processing changes according to a distance from the reference position, and
wherein the optical center position of the combined image is an average value of optical center positions of the plurality of images combined based on the positional shift amount.

33. An image processing method for processing a plurality of images acquired by sequentially capturing an object image, the image processing method comprising the steps of:
detecting a positional shift amount between the plurality of images;
generating a combined image by combining the plurality of images that have been aligned based on the positional shift amount; and
acquiring an optical center position of the combined image based on the positional shift amount,
wherein the optical center position is a reference position in performing optical correction processing for the combined image, and
wherein a correcting amount in the optical correction processing changes according to a distance from the reference position, and
wherein acquiring the optical center position of the combined image using an average value of optical center positions of the plurality of images in a case where an optical image stabilization mechanism operates during exposure.

* * * * *